United States Patent [19]
Archambault

[11] Patent Number: 5,577,327
[45] Date of Patent: Nov. 26, 1996

[54] ADJUSTABLE LENGTH LEVEL DEVICE WITH INTERNAL LOCKING MECHANISM

[76] Inventor: Roland A. Archambault, 625 Iron Mine Hill Rd., North Smithfield, R.I. 02896

[21] Appl. No.: 555,880

[22] Filed: Nov. 14, 1995

[51] Int. Cl.⁶ .................... G01C 9/24; G01C 9/28
[52] U.S. Cl. .................................................. 33/374
[58] Field of Search ................ 33/374, 375, 376, 33/809

[56] References Cited

U.S. PATENT DOCUMENTS

| | | | |
|---|---|---|---|
| 149,532 | 4/1874 | Sherwin | 33/809 |
| 1,205,946 | 11/1916 | Lyons | 33/376 |
| 1,235,956 | 8/1917 | Berkebile | 33/376 |
| 1,529,709 | 3/1925 | Neumann | 33/376 |
| 1,605,604 | 11/1926 | Nerbon | 33/376 |
| 2,419,451 | 4/1947 | Keller | 33/374 |
| 3,104,477 | 9/1963 | Edwill | 33/374 |
| 4,130,943 | 12/1978 | Talbot | 33/374 |
| 4,566,200 | 1/1986 | Brady et al. | 33/809 |
| 4,607,437 | 8/1986 | McSorley Sr. et al. | 33/374 |
| 4,894,925 | 1/1990 | Langmaid | 33/374 |
| 4,928,395 | 5/1990 | Good | 33/374 |

FOREIGN PATENT DOCUMENTS 2278918  12/1994  United Kingdom ........... 33/376

*Primary Examiner*—Thomas B. Will

[57] ABSTRACT

An expandable level device includes a central housing having a horizontally oriented tubular spirit vial disposed within a front wall thereof. The central housing has an extension rod slidably extending outwardly of opposing end portions thereof. A pair of outer housings each has a vertically oriented tubular spirit vial disposed within a front wall thereof. Each of the outer housings slidably receives a distal end of one of the extension rods therein.

1 Claim, 3 Drawing Sheets

ADJUSTABLE LENGTH LEVEL DEVICE WITH INTERNAL LOCKING MECHANISM

BACKGROUND OF THE INVENTION

1. Field of the Invention

The present invention relates to an expandable level device and more particularly pertains to articulating along rod members to form variable lengths with an expandable level device.

2. Description of the Prior Art

The use of extension levels is known in the prior art. More specifically, extension levels heretofore devised and utilized for the purpose of extending between short and long sizes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,130,943 to Talbot discloses an extension level.

U.S. Pat. No. 4,928,395 to Good discloses an extensible level.

U.S. Pat. No. 4,733,475 to Youmans discloses an extension level apparatus.

U.S. Pat. No. 4,607,437 to McSorley, Sr. et al. discloses an adjustable level.

U.S. Pat. No. 4,862,595 to Drumright discloses an extension level.

U.S. Pat. No. 4,894,925 to Langmaid discloses an extendable level.

While these devices fulfill their respective, particular objective and requirements, the aforementioned patents do not describe an expandable level device for articulating along rod members to form variable lengths.

In this respect, the expandable level device according to the present invention substantially departs from the conventional concepts and designs of the prior art, and in doing so provides an apparatus primarily developed for the purpose of articulating along rod members to form variable lengths.

Therefore, it can be appreciated that there exists a continuing need for new and improved expandable level device which can be used for articulating along rod members to form variable lengths. In this regard, the present invention substantially fulfills this need.

SUMMARY OF THE INVENTION

In the view of the foregoing disadvantages inherent in the known types of extension levels now present in the prior art, the present invention provides an improved expandable level device. As such, the general purpose of the present invention, which will be described subsequently in greater detail, is to provide a new and improved expandable level device and method which has all the advantages of the prior art and none of the disadvantages.

To attain this, the present invention essentially comprises a central housing having a horizontally oriented tubular spirit vial disposed within a front wall thereof. The central housing has a pair of horizontal chambers formed within a central portion thereof. Each of the horizontal chambers has an extension rod slidably extending outwardly of opposing end portions thereof. Each proximal end of the extension rods has a stop mechanism secured thereto precluding disengagement of the extension rods from the horizontal chambers. Each distal end of the extension rods has a recess formed therein. A pair of outer housings each have a vertically oriented tubular spirit vial disposed within a front wall thereof. Each of the outer housings have a pair of horizontal chambers formed within a central portion thereof. Each of the horizontal chambers of the outer housings slidably receives the distal end of one of the extension rods therein. Each of the outer housings have a spring biased stop mechanism secured within an inner edge thereof. Each spring biased stop mechanism cooperates with the recess formed in the distal end of one of the extension rods to preclude disengagement of the extension rod from the horizontal chambers of the outer housings.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved expandable level device which has all the advantages of the prior art extension levels and none of the disadvantages.

It is another object of the present invention to provide a new and improved expandable level device which may be easily and efficiently manufactured and marketed.

It is a further object of the present invention to provide a new and improved expandable level device which is of durable and reliable construction.

An even further object of the present invention is to provide a new and improved expandable level device which is susceptible of a low cost of manufacture with regard to both materials and labor, and which accordingly is then susceptible of low prices of sale to the consuming public, thereby making such an expandable level device economically available to the buying public.

Still yet another object of the present invention is to provide a new and improved expandable level device which provides in the apparatuses and methods of the prior art some of the advantages thereof, while simultaneously overcoming some of the disadvantages normally associated therewith.

Even still another object of the present invention is to provide a new and improved expandable level device for articulating along rod members to form variable lengths.

Lastly, it is an object of the present invention to provide a new and improved expandable level device includes a central housing having a horizontally oriented tubular spirit vial disposed within a front wall thereof. The central housing has an extension rod slidably extending outwardly of opposing end portions thereof. A pair of outer housings each has a vertically oriented tubular spirit vial disposed within a front wall thereof. Each of the outer housings slidably receives a distal end of one of the extension rods therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
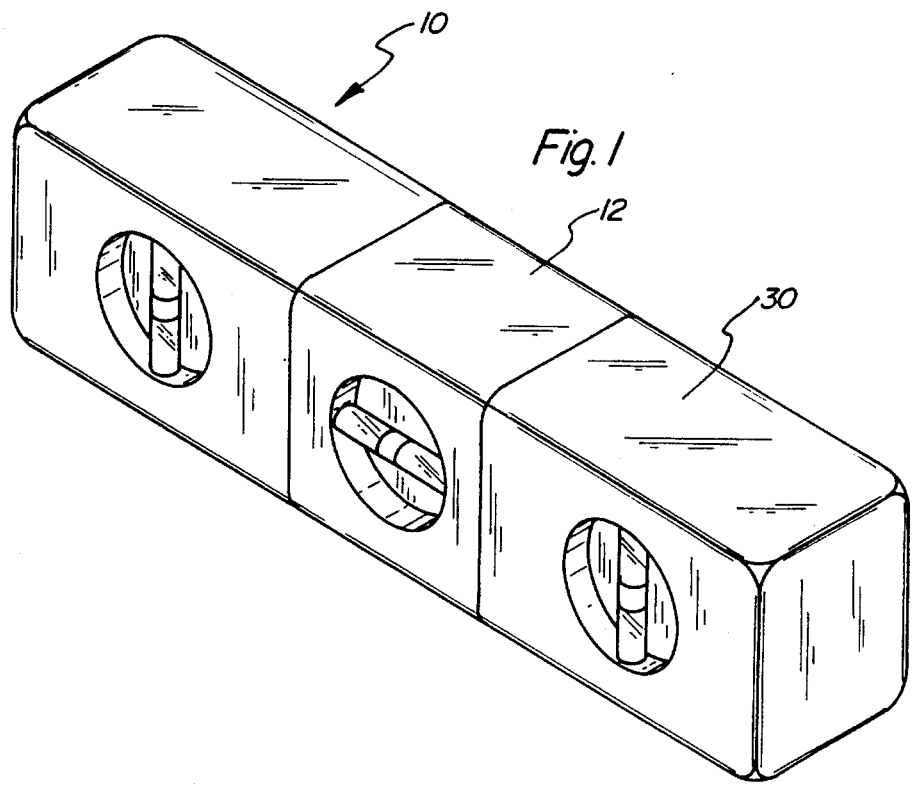
FIG. 1 is a perspective view of the preferred embodiment of the expandable level device constructed in accordance with the principles of the present invention.
Figure 2:
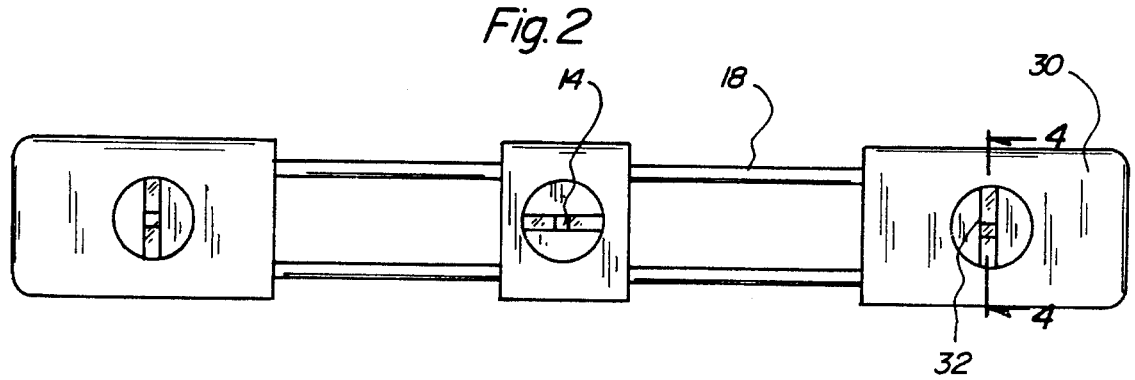
FIG. 2 is a front elevation view of the present invention.
Figure 3:
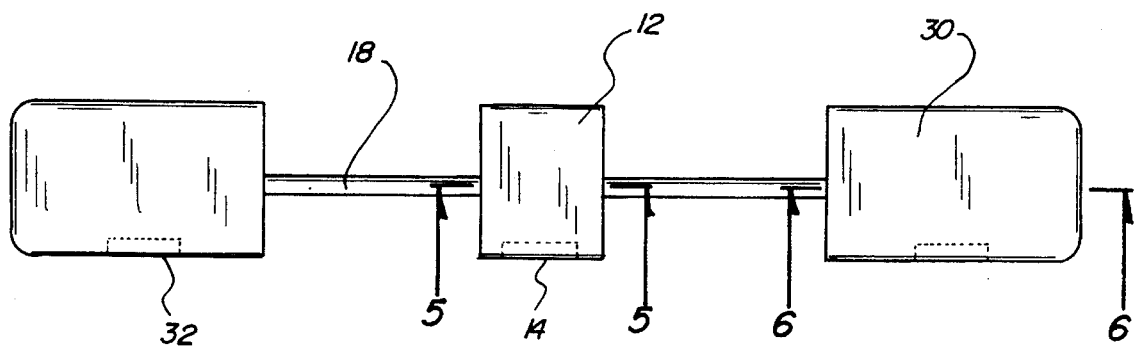
FIG. 3 is a plan view of the preferred embodiment of the present invention.
Figure 4:
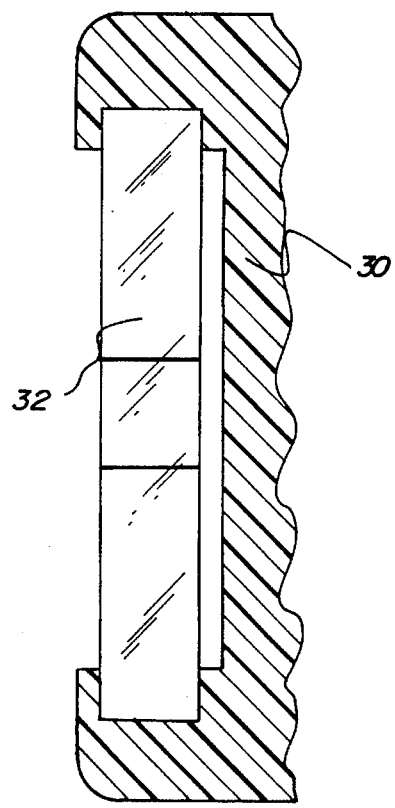
FIG. 4 is a cross-sectional view as taken along line 4—4 of FIG. 2.
Figure 5:
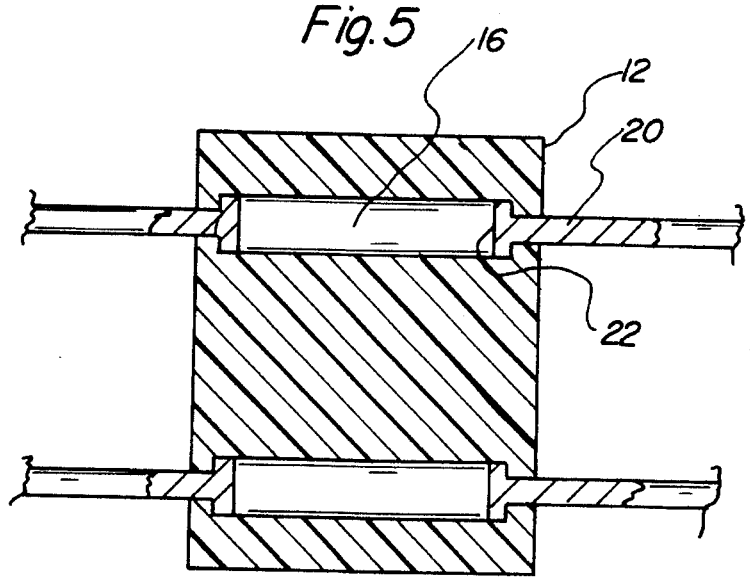
FIG. 5 is a cross-sectional view as taken along line 5—5 of FIG. 3.
Figure 6:
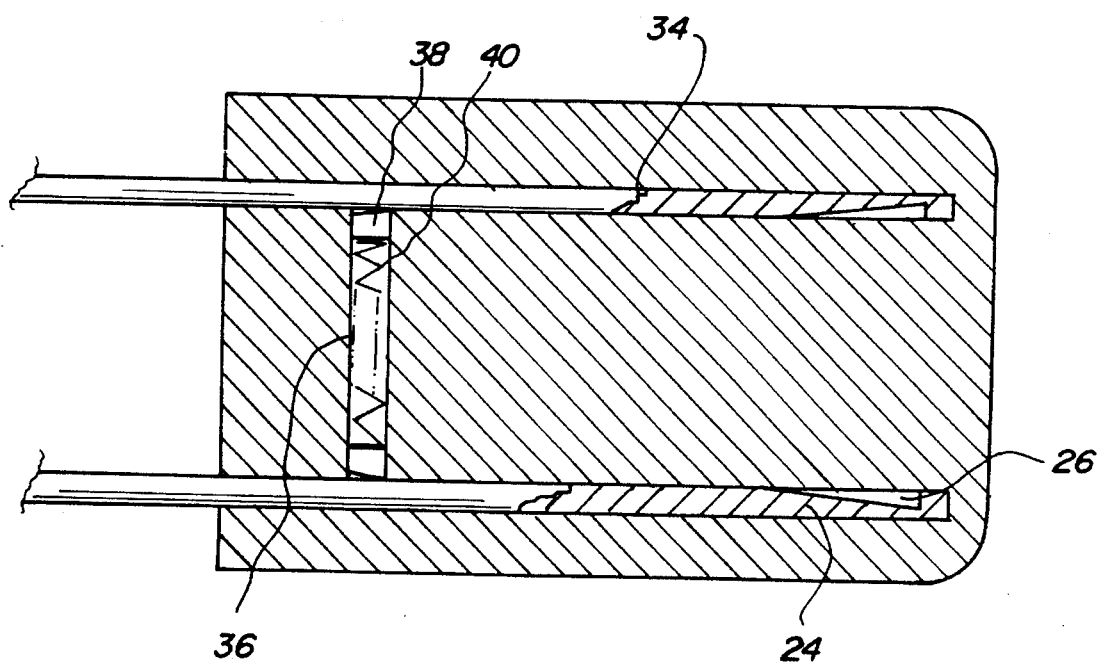
FIG. 6 is a cross-sectional view as taken along line 6—6 of FIG. 3.

With reference now to the drawings, and in particular, to FIGS. 1–6 thereof, the preferred embodiment of the new and improved expandable level device embodying the principles and concepts of the present invention and generally designated by the reference number 10 will be described.

Specifically, it will be noted in the various Figures that the device relates to a new and improved expandable level device for articulating along rod members to form variable lengths. In its broadest context, the device consists of a central housing and a pair of outer housings. Such components are individually configured and correlated with respect to each other so as to attain the desired objective.

The device 10 includes a central housing 12 having a horizontally oriented tubular spirit vial 14 disposed within a front wall thereof. The central housing 12 has a pair of horizontal chambers 16 formed within a central portion thereof. The pair of horizontal chambers 16 have a length equal to about eighty percent of the overall length of the central housing 12. Each of the horizontal chambers 16 has an extension rod 18 slidably extending outwardly of opposing end portions thereof. Each proximal end 20 of the extension rods 18 has a stop mechanism 22 secured thereto precluding disengagement of the extension rods 18 from the horizontal chambers 16. The stop mechanism 22 extends above and below end portions of the horizontal chamber 16 it is disposed within. The stop mechanisms 22 will also abut opposing stop mechanisms to limit the internal movement of the extension rods 18. Each distal end 24 of the extension rods 18 has a recess 26 formed therein. Each recess 26 is formed at an incline with the deepest portion of the recess 26 at a far end thereof.

The device 10 also includes a pair of outer housings 30 each having a vertically oriented tubular spirit vial 32 disposed within a front wall thereof. The pair of outer housings 30 have a length about twice the length of the central housing 12. Each of the outer housings 30 have a pair of horizontal chambers 34 formed within a central portion thereof. Each of the horizontal chambers 34 of the outer housings 30 slidably receives the distal end 24 of one of the extension rods 18 therein. Each of the outer housings 30 have a spring biased stop mechanism 36 secured within an inner edge thereof. The spring biased stop mechanism 36 is disposed between the pair of horizontal chambers 34. Each spring biased stop mechanism 36 cooperates with the recess 26 formed in the distal end 24 of one of the extension rods 18 to preclude disengagement of the extension rod 18 from the horizontal chambers 34 of the outer housings 30. The spring biased stop mechanism 36 includes a pair of bearings 38 on opposing ends thereof and a pair of springs 40 that bias the bearings 38 within the horizontal chambers 34. Once the extension rods 18 are extended too far, the recess 26 will allow the bearings 38 to spring up, with the bearings 38 abutting a far edge of the recess 26 thereby precluding separation of the extension rods 18 from the outer housings 30. The device 10 allows a carpenter or other user to adjust the length of the level to accommodate a limited space or alternatively a larger space.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An adjustable length level device with internal locking mechanism for articulating along rod members to form variable lengths comprising, in combination:

a central housing having a horizontally oriented tubular spirit vial disposed within a front wall thereof, the central housing having a pair of horizontal chambers formed within a central portion thereof, each of the horizontal chambers having an extension rod slidably extending outwardly of opposing end portions thereof, each proximal end of the extension rods having a stop mechanism secured thereto precluding disengagement of the extension rods from the horizontal chambers, each distal end of the extension rods having an angularly declining recess formed therein;

a pair of outer housings each having a vertically oriented tubular spirit vial disposed within a front wall thereof, each of the outer housings having a pair of horizontal chambers formed within a central portion thereof, each of the horizontal chambers of the outer housings slidably receiving the distal end of one of the extension rods therein, each of the outer housings having an internally disposed spring biased stop mechanism secured inwardly of an inner edge thereof, each spring biased stop mechanism being disposed between the extension rods, each spring biased stop mechanism cooperating with the angularly declining recess formed in the distal ends of the extension rods to preclude disengagement of the extension rods from the horizontal chambers of the outer housings.

* * * * *